United States Patent
Degott et al.

(10) Patent No.: US 8,246,735 B2
(45) Date of Patent: Aug. 21, 2012

(54) COATING COMPOSITION FOR PRODUCING MAGNETICALLY INDUCED IMAGES

(75) Inventors: Pierre Degott, Crissier (CH); Claude-Alain Despland, Prilly (CH); Patrick Magnin, Maxilly-sur-Leman (FR); Patrick Veya, Tolochenaz (CH); Mathieu Schmid, Lausanne (CH); Edgar Müller, Fribourg (CH); Albert Stichelberger, Leonding (AT)

(73) Assignee: SICPA Holding SA, Prilly (CH)

( * ) Notice: Subject to any disclaimer, the term of this patent is extended or adjusted under 35 U.S.C. 154(b) by 879 days.

(21) Appl. No.: 12/300,469

(22) PCT Filed: Mar. 29, 2007

(86) PCT No.: PCT/EP2007/052993
§ 371 (c)(1),
(2), (4) Date: Nov. 12, 2008

(87) PCT Pub. No.: WO2007/131833
PCT Pub. Date: Nov. 22, 2007

(65) Prior Publication Data
US 2009/0184169 A1    Jul. 23, 2009

(30) Foreign Application Priority Data
May 12, 2006 (EP) .................... 06113891

(51) Int. Cl.
*C09D 11/00* (2006.01)
(52) U.S. Cl. .................... 106/31.6; 106/31.65
(58) Field of Classification Search .............. 106/31.6, 106/31.65
See application file for complete search history.

(56) References Cited

U.S. PATENT DOCUMENTS

| 2,418,479 | A | 4/1947 | Pratt et al. |
| 2,570,856 | A | 10/1951 | Pratt et al. |
| 3,676,273 | A | 7/1972 | Graves |
| 3,791,864 | A | 2/1974 | Steingroever |
| 4,705,300 | A | 11/1987 | Berning et al. |
| 4,705,356 | A | 11/1987 | Berning et al. |
| 4,721,271 | A | 1/1988 | Goldstein et al. |
| 4,838,648 | A | 6/1989 | Phillips et al. |
| 5,279,657 | A | 1/1994 | Phillips et al. |

(Continued)

FOREIGN PATENT DOCUMENTS

DE    2006848    9/1971

(Continued)

OTHER PUBLICATIONS

CRC Handbook of Chemistry and Physics, 70th Edition, 1989-1990, pp. B13 and B26, CRC Press, Inc., Boca Raton, Florida, U.S.

(Continued)

Primary Examiner — Patricia L. Hailey
Assistant Examiner — Veronica F Faison
(74) Attorney, Agent, or Firm — Greenblum & Bernstein, P.L.C.

(57) ABSTRACT

The present invention is related to a coating composition for the production of a magnetically induced image, consisting of volatile components (S) and non-volatile components, the latter consisting of an ink vehicle (I) and magnetically orientable optically variable interference pigment (P), to a process for manufacturing the coating composition, and to the use of the composition for the production of a magnetically induced image coating on a substrate with the help of applied magnetic fields. Said magnetically induced image coating may be used as a security device on value- or identity documents, brand protection labels and the like.

24 Claims, 3 Drawing Sheets

U.S. PATENT DOCUMENTS

| | | | |
|---|---|---|---|
| 5,364,689 | A | 11/1994 | Kashiwagi et al. |
| 5,607,504 | A | 3/1997 | Schmid et al. |
| 5,624,486 | A * | 4/1997 | Schmid et al. ............ 106/404 |
| 5,807,497 | A | 9/1998 | Gailberger et al. |
| 5,824,733 | A | 10/1998 | Dobert et al. |
| 6,103,361 | A | 8/2000 | Batzar et al. |
| 6,838,166 | B2 | 1/2005 | Phillips et al. |
| 7,625,632 | B2 * | 12/2009 | Argoitia ............ 428/402 |
| 2002/0160194 | A1 | 10/2002 | Phillips et al. |
| 2004/0009309 | A1 | 1/2004 | Raksha et al. |
| 2004/0051297 | A1 | 3/2004 | Raksha et al. |
| 2006/0081151 | A1 * | 4/2006 | Raksha et al. ............ 106/31.92 |
| 2006/0150854 | A1 * | 7/2006 | Benninger et al. ............ 101/489 |

FOREIGN PATENT DOCUMENTS

| | | |
|---|---|---|
| EP | 0227423 | 7/1987 |
| EP | 0227423 | 6/1992 |
| EP | 710508 | 5/1996 |
| EP | 686675 | 2/1998 |
| EP | 1650042 | 4/2006 |
| WO | 95/29140 | 11/1995 |
| WO | 02/073250 | 9/2002 |
| WO | 02/090002 | 11/2002 |
| WO | 03/000801 | 1/2003 |
| WO | 2004/101890 | 11/2004 |
| WO | 2005/002866 | 1/2005 |
| WO | 2006/063926 | 6/2006 |

OTHER PUBLICATIONS

Magnesium Fluoride Product Description, http://www.chemicalbook.com/ChemicalProductProperty_DE_CB8716701.htm, 2009.
Römpp Lexikon Lacke and Druckfarben, 1998, Georg Thieme Verlag, Germany.
Security Data sheet Neocryl BT100, Nov. 1997, Zeneca Resins, the Netherlands.
Security Data sheet Neocryl BT100 DSM Neo Resins, 2010, SpecialChem S.A.
Security Data sheet Neocryl BT101, 2010, SpecialChem S.A.
Security Data sheet Neocryl BT102, 2010, SpecialChem S.A.
Security Data sheet Neocryl BT103, 2010, SpecialChem S.A.
Security Data sheet Neocryl BT105, 2010, SpecialChem S.A.
Security Data sheet AMP 95, Angus Chemie GmbH, Oct. 31, 1991.
Product Information Tego Foamex 800, Tego Chemie Service GmbH, Nov. 1997.
Product Information Aerosil 200, Evonik Degussa GmbH, Germany.
The Printing Ink Manual, Fifth Edition, Blueprint, 1993, London, England, pp. 5, 8-10, 76-77, 195, 547-551, 599-603, 606, 636-638, 641-644.
Flexographic Printing, Merck KGaA, Germany.
Gravure Printing, Merck KGaA, Germany.

* cited by examiner

COATING COMPOSITION FOR PRODUCING MAGNETICALLY INDUCED IMAGES

FIELD OF THE INVENTION

The present invention relates to coating compositions for producing magnetically induced images. More specifically it relates to printing inks for producing magnetically induced images for use on security- or value-documents or on branded goods, to protect them against counterfeit or illegal reproduction.

BACKGROUND OF THE INVENTION

Optically variable devices of various types are used as efficient anti-copying means on security- and value-documents. Among these, particularly important optically variable copy-protection means are the optically variable inks (OVI®; EP-A-0227423). Optically variable inks (OVI®) are used to print surfaces and/or indicia which exhibit a viewing angle dependent color (=color shift).

Said anti-copying inks are formulated on the basis of optically variable pigments (OVP); preferred types being the flake shaped thin-film optical interference pigments described in U.S. Pat. No. 4,705,300; U.S. Pat. No. 4,705,356; U.S. Pat. No. 4,721,271 and thereto related disclosures.

Other useful types of OVP for optically variable ink formulations comprise the interference coated particles described in U.S. Pat. No. 5,624,486 and U.S. Pat. No. 5,607,504, and the thin-film cholesteric (i.e. chiral-nematic) liquid crystal pigments described in U.S. Pat. No. 5,807,497 and U.S. Pat. No. 5,824,733.

Optically variable inks, coatings and paints are known in the art, e.g. from EP-A-0227423, U.S. Pat. No. 5,279,657, or WO 95/29140. Said optically variable inks can be used in various printing processes, such as copperplate (Intaglio) printing, gravure printing, flexographic printing or screen printing.

As known to the skilled person, the wet film thickness resulting from the said printing processes can vary to a large extent, form about 2 µm up to about 50 µm depending upon the process and the conditions used.

To achieve a high color-shifting effect of the optically variable ink or coating, the shape of the optically variable pigment (OVP) is preferably a platelet or a flake, as disclosed in the art.

The perceived optical characteristics and the color purity depend on the pigment's final orientation in the cured ink or coating layer on the substrate. Randomly oriented optically variable pigment flakes or platelets exhibit a poor color shift and low color purity. Maximum color shift and color purity requires the optically variable pigment flakes or platelets in the ink or coating to adopt a same particular orientation, e.g. coplanar to the surface of the substrate.

These optical effects are even more enhanced if the surface of the substrate has been previously smoothened through the application of a base coating. The optically variable pigment flakes can in this case arrange more readily in a flat plane, thus increasing the coverage on the substrate, the color purity and the color shift.

To obtain coatings having the optically variable pigment flakes arranged in a same flat plane on a substrate, an ink or coating formulation which allows for a reduction of the wet film thickness during the drying process to less than 10 µm is normally used. The gradual reduction of the film thickness during the drying process forces the optically variable pigment flakes to arrange in a single plane parallel to the surface of the substrate, providing for a maximum coverage and color shift on the substrate.

Magnetic optically variable pigments have been disclosed in WO 02/073250; U.S. Pat. No. 4,838,648; EP-A-686675; WO 03/00801 and U.S. Pat. No. 6,838,166 as an improvement to the optically variable pigments for inks on security-, value-documents and banknotes; these documents are incorporated herein by reference.

Magnetic optically variable pigments in printing inks or coatings allow for the production of magnetically induced images, designs and/or patterns through the application of a corresponding magnetic field, causing a local orientation of the magnetic optically variable pigment in the coating, followed by drying/curing the latter. The result is a fixed magnetically induced image, design or pattern in an optically variable ink.

Materials and technology for the orientation of magnetic particles in coating compositions and printing processes have been disclosed in U.S. Pat. No. 2,418,479; U.S. Pat. No. 2,570,856; U.S. Pat. No. 3,791,864; DE 2006848-A; U.S. Pat. No. 3,676,273; U.S. Pat. No. 5,364,689; U.S. Pat. No. 6,103,361; US 2004/0051297; US 2004/0009309; EP-A-710508, WO 02/090002; WO 03/000801; WO 2005/002866, and US 2002/0160194; these documents are incorporated herein by reference.

U.S. Pat. No. 2,418,479 and U.S. Pat. No. 2,570,856 disclose a process and a coating composition for the magnetic orientation of metallic pigments in paint films. Said films have a high degree of orientation and a low degree of brightness, as well as unusual reflectance and translucency properties. The metallic pigments comprise flakes of ferromagnetic material, preferably nickel, in amounts ranging from 0.1% to 95% by weight of the film forming binder; and volatile organic components are present in the composition in amounts ranging from 50% to 70% of the total weight. The wet film is applied in a thickness of 25 mils (635 µm), and subject to a magnetic field for orienting the metallic flakes, maintaining the field until the film is dry. These documents are not concerned with OVI® and disclose merely paint compositions comprising magnetic metal flake pigments and effect coatings based thereupon. No formulation rules are given as to the relationship of flake size, flake concentration and coating thickness for obtaining the best optical effect.

U.S. Pat. No. 3,791,864 and DE 2006848-A refer to stove-enamel compositions, nitro-cellulose compositions, and two-component compositions comprising magnetic components (e.g. lamellar or rod shaped iron pigments), for the production of magnetically oriented coatings. The documents are about a method and a process for the magnetic orientation of pigments in two layer coatings; the formulation aspects of the involved coating composition are not, however, contemplated.

U.S. Pat. No. 3,676,273 discloses a magnetically oriented coating, comprising highly reflective nickel flakes dispersed in an acrylic binder. The amount of magnetic pigment ranges form 0.1% to 95% by weight of the film forming material. Specific formulation aspects are not addressed in this document.

U.S. Pat. No. 5,364,689 discloses a painted product comprising magnetic non-spherical particles in a paint medium, wherein the said magnetic particles are oriented to yield a pattern of a three-dimensional optical appearance. The magnetic particles comprise one or more of nickel, cobalt, iron, and their alloys. The particles have a thickness of 0.1 to 1.0 µm and a length of 10 to 100 µm. The paint medium is selected from alkyd, polyester, acrylic, polyurethane, and vinyl resins.

The particles are present in amounts between 1 and 60 parts per 100 parts by weight of the paint medium. No particular rules concerning the formulation of the paint medium are given, however.

U.S. Pat. No. 6,103,361 refers to heat resistant coating compositions containing fluoropolymers, such as PFTE (poly-tetrafluoroethylene) and magnetizable flakes, which allow for the magnetically inducing of a pattern in the coating of a frying pan.

US 2004/0051297 and US 2004/0009309 refer to a method and an apparatus for orienting magnetic flakes during a painting or printing process. Particles of a magnetic optically variable pigment are dispersed in a liquid paint or ink medium. The typical flake is about 20 μm large and about one μm thick. The flakes typically include a magnetic metal layer such as a thin film of ferromagnetic metal or alloy, such as cobalt, nickel or PERMALLOY (typically 80% Ni, 20% Fe) and an optical interference structure, such as an absorber-dielectric-reflector Fabry-Perot type structure on both sides of the metal layer. US 2004/0051297 contains a remark as to the influence of film thickness and the type of organic carrier used on the magnetic orientability of the pigments. However, no further details concerning the best formulation of the coating composition for the application purpose are disclosed.

WO 02/090002 refers to methods for producing imaged coated articles by using magnetic optically variable pigment, as well as to coated articles. The pigment consists of reflective magnetic flakes (RMF) of the type described in WO 03/000801 "Multi-Layered Magnetic Pigments and Foils" and has a magnetic core layer. No formulation rules are given, however, as to the coating composition which should be used.

WO 05/002866 refers to a method and means for producing a magnetically induced design in a coating containing magnetic particles. Said coating comprises preferably magnetic optically variable particles. The coating composition is preferably selected from the group of liquid inks, comprising screen-printing inks, gravure inks and flexographic inks. Liquid inks have low viscosity (in the range of 0.1 to 5 Pa*s at 20° C.) and allow for an easy orientation of the magnetic pigment. Drying/curing of the ink can be based on solvent or water evaporation, as well as on UV-crosslinking or on hybrid curing mechanisms, including evaporation of diluents, UV-curing and other reticulation reactions, such as oxypolymerization cross-linking reactions. None of the given ink formulas were optimized, however, with respect to the magnetic image/effect imprinted in the coating.

US 2002/0160194 refers to multi-layered magnetic pigments and foils. The disclosed pigment flakes can be interspersed within a binder medium to produce a colorant composition (ink) which can be applied to a wide variety of objects or papers. The binder medium contains a resin or mixtures of resins, and a solvent (organic solvent or water), and can be dried/cured by thermal processes such as thermal cross-linking, thermal setting, or thermal solvent evaporation, or by photochemical cross-linking.

The optically variable inks and coating compositions used in the art are aimed at exhibiting a bright color, a strong color shift and yielding a good substrate coverage using an as low as possible amount of optically variable pigment. A low pigment concentration is desirable to limit the raw material costs, as well as to obtain a good printability of the ink and durability of the print. These objectives are achieved by providing the printing inks with a relatively high amount of volatile components such as organic solvents, water or mixtures thereof, of the order of 50% or more, per weight of the composition, and a relatively low amount of non-volatile components, i.e. the binder medium and the OVP, of the order of 50% or less, per weight of the composition.

This particular formulation ensures a volume reduction of the coating layer during the drying process and a corresponding orientation of the OVP particles in the plane of the printed substrate. This is why most OVI formulations or coating formulations containing optical effect pigments are solvent or water based, with solid contents not exceeding 50%. The solid content represents the part of non-volatile compounds of a printed ink or coating layer after the drying/curing process.

In the case of magnetic optically variable pigments however, it has been found that this type of ink formulations, when used for the magnetic induction of images, patterns or designs in the printed ink layer, leads to poor visual effects.

SUMMARY OF THE INVENTION

The technical problem underlying the present invention was to find coating compositions and corresponding formulation rules which are particularly adapted for the magnetic orientation of magnetic optically variable pigment (MOVP) in a printed ink or coating layer, yielding an attractive visual effect. With conventional formulations, suited for printing OVI®, the magnetic images transferred into the wet ink film are noteworthy strongly diminished in resolution and contrast during the drying/curing process, due to the vertical shrinking of the printed ink or coating layer.

The resulting inks should be compatible with standard printing requirements such as drying speed and printing resolution, as well as with economical constraints to control cost by limiting the applied quantities. The printing techniques to be used to print MOVP particles should be (copperplate) intaglio-, flexography-, gravure-, screen-printing as well as roller coating.

According to the present invention, this problem has been solved by a coating composition as defined in the appended claims.

In particular, the present invention is related to a coating composition for producing a magnetically induced image according to the present invention therefore consists of volatile components (S) and non-volatile components, the latter consisting of an ink vehicle (I) and magnetically orientable optically variable interference pigment (P), characterized in that the ratio of the volume of the ink vehicle (V(I)) to the volume of the pigment (V(P)) is higher than 3.0, preferably higher than 4.0, and most preferably higher than 5.0.

The present invention is also related to a process for manufacturing a coating composition for producing a magnetically induced image, which comprises the step of mixing together volatile components (S), and non-volatile components, the latter consisting of an ink vehicle (I) and magnetically orientable optically variable interference pigment (P), characterized in that the ratio of the volume of the ink vehicle (V(I)) to the volume of the pigment (V(P)) is higher than 3.0, preferably higher than 4.0, and most preferably higher than 5.0.

According to the present invention, the term "magnetic optically variable pigment (MOVP)" refers to platelet or flake shaped magnetic pigment particles carrying an optical interference coating, as known in the art. The particular characteristic of MOVP with respect to OVP is that the MOVP particles can be oriented by an applied magnetic field. MOVP are thus "magnetically orientable optically variable interference pigments". The MOVP comprised in the printing ink or coating composition of the present invention consists of flat platelet or flake shaped particles chosen from the group of vacuum deposited magnetic thin film interference pigments, interference coated metallic pigments, interference coated nonmetallic pigments, magnetic liquid crystal pigments as disclosed in PCT/EP2005/056260, and mixtures thereof. Particularly preferred are the five-layer or the seven-layer vacuum deposited thin film interference pigments of U.S. Pat. No. 4,838,648 and WO 02/73250.

The MOVP used in the present invention is also characterized by its average particle size. In order to get saturated colours and abrupt colour changes, the mean particle diameter (d50) should typically range from 5 to 40 μm, preferably from 15 to 25 μm, and have a thickness in the range of 0.1 to 6 μm, more preferably in the range of 0.5 to 3 μm.

According to the present invention, the term "Volatile components" refers to components having a boiling point below 300° C. at ambient pressure, i.e. everything which eventually evaporates after printing. The volatile components present in the coating/ink composition can be chosen from organic solvents, water and mixtures thereof, i.e. from solvents typically used for making printing inks.

According to the present invention, the term "non-volatile components" refers to components having a boiling point of at least 300° C. at ambient pressure, i.e. everything which remains after printing.

According to the present invention, the term "ink vehicle" refers to the non-volatile part of a printing ink or coating composition, except the magnetic optically variable interference pigment. The ink vehicle may, however, comprise other pigments. Thus, the ink vehicle according to the present invention may comprise components from the group consisting of varnishes (i.e. binders), oligomers, fillers, pigments, dyes, leveling agents, wetting agents, surfactants, corrosion inhibitors, drying catalysts, photo initiators, waxes, cross-linking agents, non-volatile diluents or monomers.

According to the present invention, the term "volume of the ink vehicle" refers to the volume of the dried/cured ink vehicle.

According to the present invention, by the term "drying", three different mechanisms are commonly addressed in the art. Two merely physical drying processes refer to the evaporation of volatile components from the printed ink or coating, leaving back its solid resin and pigment components, and to the penetration/absorption of non-volatile ink or coating solvent into the substrate. A third, chemical drying process, also called hardening or curing, refers to the transformation of a liquid composition into a solid one through a chemical polymerization or cross-linking reaction initiated by UV radiation, electron beam or oxypolymerization (oxidative reticulation induced by the joint action of oxygen and catalysts, such as Co and Mn catalysts). One or more of these drying processes may be implied in the drying of a same particular printing ink or coating. Thus, curing is a specific embodiment of drying. "Dual Curing" means a combination of physical evaporation and/or penetration in the substrate of volatile components with UV curing or oxypolymerization or chemical polymerisation initiated with an appropriate additive; "UVOX" means a combination of UV curing and oxypolymerization.

The printing techniques which can be used to print MOVP particles are (copperplate) intaglio-, flexography-, gravure-, screen-printing as well as roller coating.

To achieve the printing requirements, the corresponding printing elements are selected so as to deposit typical average dry ink film thickness in the range of 2 to 50 μm, preferably of 5 (flexography) to 30 μm (intaglio- or screen-printing).

The average diameter of the pigment is selected in function of the layer thickness which can be typically obtained and of the technical constraints linked to a given printing application. Selecting too small pigments will, in all cases, result in poor colour shifting, strong light scattering and low chroma. This is well-known to the skilled man and will be taken into consideration by him when selecting the appropriate pigments.

It was found that a vertical shrinking of the printed ink or coating layer during the drying/curing process must be avoided, in order to prevent the oriented pigment particles from adopting a flat position, which significantly reduces or even completely destroys the orientation effect produced by the magnetization. This is achieved by providing a sufficiently thick layer of non-volatile ink vehicle which will remain after evaporation of the volatile components.

Thus, of paramount importance is the volume ratio $V(I)/V(P)$ of the dried/cured ink vehicle (I) to that of the magnetic optically variable pigment (P) present in the ink vehicle. It was found that below a volume ratio $V(I)/V(P)$ of 3.0 it was impossible to produce a satisfactory magnetically induced image in a coating of the present invention. According to the present invention, Volume ratios are calculated based on experimental data and known product characteristics, as disclosed hereinafter in the detailed description.

What has to be considered is the thickness of the dried/cured ink layer. Inventors have found that the dried/cured solid ink layer should not be less in thickness than $d50/3$, preferably not less than $d50/2$, in order to obtain an orientable coating layer yielding a satisfactory magnetically oriented image. The quantity d50 is the mean diameter of the magnetic optically variable pigment and determined as known in the art.

In coatings, which are significantly thinner than $d50/2$, the achievable orientation effect is poor.

The coating composition of the present invention for producing magnetic images may be a copperplate intaglio printing ink, a flexographic printing ink, a gravure printing ink, a silkscreen printing ink, or a roller coating ink, and can be correspondingly used in a copperplate intaglio-, a flexographic-, a gravure-, a silkscreen-printing or a roller-coating process.

BRIEF DESCRIPTION OF THE DRAWINGS

FIGS. 1 to 3 show (a) the different optical effects obtained with the three exemplary compositions, and (b) the resulting pigment orientation inside the ink layers.

FIG. 1 shows the results obtained with a UV cured screen printing ink according to example 2a. In FIG. 1a, the resulting magnetized image is shown. In FIG. 1b, a Scanning electron microscope (SEM) cross section of the ink layer on the substrate is shown.

FIG. 2 shows the results obtained with a UV cured screen printing ink according to example 2b. In FIG. 2a, the resulting magnetized image is shown. In FIG. 2b, a Scanning electron microscope (SEM) cross section of the ink layer on the substrate is shown.

FIG. 3 shows the results obtained with a UV cured screen printing ink according to example 2c. In FIG. 3a, the resulting magnetized image is shown. In FIG. 3b, a Scanning electron microscope (SEM) cross section of the ink layer on the substrate is shown.

DETAILED DESCRIPTION OF THE INVENTION

The magnetic optically variable printing inks or coating compositions of the present invention are divided into three main constituents. The magnetic optically variable pigment (P), the solvents or volatile components (S), (i.e. everything which eventually evaporates after printing: organic solvents, water or mixtures thereof), and the ink vehicle (I), (i.e. everything which remains after printing, except the pigment: i.e. non-volatile components such as varnishes, oligomers, fillers, pigments, dyes, leveling agents, wetting agents, surfactants, corrosion inhibitors, drying catalysts, photo initiators, waxes, cross-linking agents, non-volatile diluents or monomers).

The magnetic pigment of the present invention is typically chosen such, that the platelet shaped particles have a mean diameter (d50) in the range of 5 to 40 µm, more preferably the diameter is in the range of 15 to 25 µm, and a thickness in the range of 0.1 to 6 µm, more preferably in the range of 0.5 to 3 µm.

The diameter of the platelet shaped particles is to be understood as the mean (d50) value, determined as known to the skilled man. Similarly, the thickness of the platelet shaped particles is to be understood as the mean of the distance between the platelets' upper and lower surfaces, determined as known to the skilled man.

It was found by the inventors, that, independent of the process used for applying the magnetic ink to the substrate, there is a lower limit to the volume ratio V(I)/V(P) of the ink vehicle (I) to the magnetic optically variable pigment (P) in the ink, under which the visual effect of the magnetically oriented images, patterns or designs fades away upon drying of the wet film. This lower limit was found to be at a volume ratio V(I)/V(P) of 3.0. Good results are obtained with a volume ratio V(I)/V(P) higher than 4.0, preferably higher than 5.0.

In other words, there must be sufficient volume of ink vehicle (I) per volume of pigment (P) in the dry ink film, in order to allow the pigment flakes to keep their orientations, if this latter is not in the plane of the substrate.

For calculating the volume ratio V(I)/V(P), the volume of the ink vehicle alone, and the volume of the pigment in the ink vehicle must be known. This will be outlined hereinafter with reference to example 2.

Three ink formulations according to example 2a to 2c (UV-curing silkscreen printing inks) served as a basis for correlating formulation parameters with the obtainable magnetic orientation effect. With respect to the details of those examples, reference is made to the experimental section below. The formula of example 2a showed excellent magnetic orientability; that of example 2b showed some degradation, as compared to example 2a, and that of example 2c showed serious degradation, as compared to example 2a. It can be inferred that formulas with a ratio V(I)/V(P) lower than 3.0 will no longer show any useful effect.

Experimental data determined from the base formula of example 2 (first column) showed that the specific weight (density) of the wet ink ($D_{inkw}$) is 1.24 g/cm$^3$, ($D_{inkd}$ 1.26 g/cm$^3$ for the dry ink). The density of the magnetic optically variable pigment was determined to be 2.82 g/cm$^3$ (the pigment density varies to a certain extent, depending on the ratio of dielectric material (MgF$_2$ (optical properties)) and of magnetic material (Ni, Fe, Co or Ni alloy (magnetic properties)) in the pigment flake. The pigment used in the present example had an experimental density of 2.82 g/cm$^3$), and the density of the solvent (Dowanol) is 0.967 g/cm$^3$. The experimental densities were determined by means of a pycnometer. The use of a pycnometer for determining densities is well-known to the skilled man and needs not be discussed in detail here (cf. standard ISO 1183-1:2004).

The base wet ink formula can be approximately described as follows (wherein W=weight, V=volume before mixing, I=ink vehicle, P=MOVP, S=solvent, D=density):

$$W(I) + W(S) + W(P) = D_{inkw}(V(I) + V(S) + V(P))$$
$$= 1.241 \left[\frac{g}{cm^3}\right] * (V(I) + V(S) + V(P))[cm^3]$$

Taking into account the per weight formulation ratio W(I)+W(S)=0.80 g/g and W(P)=0.20 g/g and the density of the pigment D(P)=2.82 g/cm$^3$, the pigment volume V(P) per gram of ink is calculated by means of the known correlation d=m/V as 0.071 cm$^3$ and the remainder volume of the wet ink vehicle is 0.735 cm$^3$.

The dried/cured ink formulation can be approximately described as follows:

$$W(I) + W(P) = D_{inkd} * (V(I) + V(P))$$
$$= 1.26 \left[\frac{g}{cm^3}\right] * (V(I) + V(P))[cm^3]$$

From the data above and the density of the solvent D(S)=0.967 g/cm$^3$ (Dowanol), the quantity of evaporated solvent can be determined, and the weight of the ink vehicle results as 0.747 g/g of the original ink formulation; the corresponding volume V(I) being 0.68 cm$^3$; this gives a density of the ink vehicle D(I) of 1.098 g/cm$^3$. In the present example (base formulation), the volume ratio V(I)/V(P) is thus given as 9.58.

Referring to the magnetic orientation examples (formulations of examples 2a to 2c) the corresponding volume ratios were calculated in the same way, using the determined specific weights of the MOVP and the ink vehicle (I), and the corresponding weight percentages:

TABLE 1

| Formulation | Ex. 2a | Ex. 2b | Ex. 2c |
|---|---|---|---|
| Ink vehicle | 80 | 60 | 30 |
| V(I) | 0.729 | 0.546 | 0.273 |
| Pigment | 20 | 20 | 20 |
| V(P) | 0.071 | 0.071 | 0.071 |
| solid content | 100 | 80 | 50 |
| volume ratio V(I)/V(P) | 10.27 | 7.69 | 3.85 |
| dry film thickness | 19 | 14 | 11 |

Ink vehicle, Pigment and solid content in %; V(I) and V(P) in cm$^3$, dry film thickness in µm, the pigments used had a d50 of 22 µm.

In analogy the volume ratio V(I)/V(P) of example 1, which refers to an intaglio printing ink, was determined to 4.83. The densities of the dried/cured and the wet printing ink were determined as $D_{inkd}$=1.37 g/cm$^3$ and $D_{inkw}$=1.236 g/cm$^3$. The densities of the pigment and the solvent were determined as D(P)=2.82 g/cm$^3$, and D(S)=0.805 g/cm$^3$ (Ink solvent 27/29 Shell industrial chemicals). 0.3 g/g of pigment (P) were mixed with 0.7 g/g of (ink vehicle (I)+ink solvent (S)). The density of the ink vehicle D(I) was determined to 1.066 g/cm$^3$.

A further point to consider for a successful ink formulation is the thickness of the dried/cured solid coating layer. The coating layer should be thicker than d50/3, preferably thicker than d50/2, wherein d50 is the mean diameter of the magnetic optically variable pigment flakes, determined as known in the art.

Coatings containing solvent must be correspondingly thicker upon application than coatings which are solvent free;

considering that the thickness of the dry and solid layer, after evaporation of the solvent, must fulfill the given criteria. In the examples underlying FIG. 1 to FIG. 3, the dry solid layer thickness fulfils the preferred d50/2 criterion in all cases.

The amount of non-volatile components in the coating composition of the present invention is chosen between 50% and 100% per weight of the total composition, preferably between 80% and 100% per weight of the total composition.

FIG. 1 refers to a coating composition having a volume ratio V(I)/V(P) of 10.3 and the maximal solid content of 100% per weight (20% of MOVP), which results in optimal magnetically induced effects (images, patterns or designs) in a corresponding coating layer, whereas FIG. 3 refers to a coating composition having a volume ratio V(I)/V(P) of 3.8 and a solid content of 50% per weight (20% MOVP), which still allows to produce magnetically induced images, patterns or designs in the coating layer, albeit of low quality.

The skilled person will recognize that the general concept outlined in present description is applicable to a series of printing ink formulations with different amounts of solid contents (with different amounts of MOVP), resulting in different volume ratio of V(I)/V(P).

Table 2 is one possible compilation out of many of a calculated matrix of formulations according to the inventive concept. Volume ratios range between around 0.6 and around 23.

TABLE 2

(UV curing silkscreen ink according to example 2)

|  | SC 100% | SC 90% | SC 80% | SC 50% |
|---|---|---|---|---|
| I [%] | 90 | 80 | 70 | 40 |
| P [%] | 10 | 10 | 10 | 10 |
| V(I) [cm³/cm³] | 0.8197 | 0.7286 | 0.6375 | 0.3643 |
| V(P) [cm³/cm³] | 0.0355 | 0.0355 | 0.0355 | 0.0355 |
| V(I)/V(P) | 23.1148 | 20.5464 | 17.9781 | 10.2732 |
| I [%] | 80 | 70 | 60 | 30 |
| P [%] | 20 | 20 | 20 | 20 |
| V(I) [cm³/cm³] | 0.7286 | 0.6375 | 0.5464 | 0.2732 |
| V(P) [cm³/cm³] | 0.0709 | 0.0709 | 0.0709 | 0.0709 |
| V(I)/V(P) | 10.2732 | 8.9891 | 7.7049 | 3.8525 |
| I [%] | 70 | 60 | 50 | 20 |
| P [%] | 30 | 30 | 30 | 30 |
| V(I) [cm³/cm³] | 0.6375 | 0.5464 | 0.4554 | 0.1821 |
| V(P) [cm³/cm³] | 0.1064 | 0.1064 | 0.1064 | 0.1064 |
| V(I)/V(P) | 5.9927 | 5.1366 | 4.2805 | 1.7122 |
| I [%] | 60 | 50 | 40 | 10 |
| P [%] | 40 | 40 | 40 | 40 |
| V(I) [cm³/cm³] | 0.5464 | 0.4554 | 0.3643 | 0.0911 |
| V(P) [cm³/cm³] | 0.1418 | 0.1418 | 0.1418 | 0.1418 |
| V(I)/V(P) | 3.8525 | 3.2104 | 2.5683 | 0.6421 |

SC Solid Content, I = weight fraction of Ink vehicle, P = weight fraction of pigment, V(I)/V(P) volume ratio.

Table 2 provides for an arbitrary selection based on different total solid contents and their respective composition. From a technical point of view, the skilled man knows that for producing satisfying results a minimal amount of pigment is required, and that a high amount of pigment present in the printing ink decreases the printability of the ink and increases the costs.

Therefore Table 2 provides for the selection of suitable coating compositions with respect to the limits of the solid contents as well as to the volume ratio of V(I)/V(P) according to the present invention. The highlighted examples correspond to the most preferred ratio V(I)/V(P) higher than 5.0 of example 2 and serve a mere illustrative purpose.

Printing inks having a volume ratio below 4.0 can be suitable as well for carrying out the present invention; however, the elevated amount of magnetic optically variable pigment with respect to the ink vehicle renders the magnetic orientation of the MOVP more difficult may adds unnecessary cost to the magnetic optically variable printing ink, if the printed ink layer is thick.

The process for manufacturing the printing ink or coating composition of the present invention for producing a magnetically induced image, comprises the step of mixing together volatile components (S), and non-volatile components, the latter consisting of an ink vehicle (I) and of magnetically orientable optically variable interference pigment (P), characterized in that the ratio of the volume of the ink vehicle (V(I)) to the volume of the pigment (V(P)) is higher than 3.0, preferably higher than 4.0, more preferably higher than 5.0.

The volatile components for the process of producing a printing ink or coating composition of the present invention are chosen from organic solvents, water, and mixtures thereof.

The present invention is furthermore related to a process of producing a magnetically induced image, which comprises the steps of a) applying a coating composition according to the present invention to a substrate surface, b) orienting the magnetic pigment particles in the applied coating composition of step a) by applying a magnetic field, and c) curing/drying the oriented coating composition of step b) to fix the particles in the oriented positions.

The coating process of step a) for applying the coating composition to a substrate surface is preferably chosen from engraved copperplate intaglio printing, flexographic printing, gravure printing, roller coating, and silkscreen printing. These processes are well-known to the skilled man.

Said printing processes allow for the deposit of a wet film-layer from about 2 µm to about 50 µm. The preferred wet film deposit is in the range from about 5 µm to about 30 µm. The resulting coating on the substrate has an average dry layer thickness comprised between 2 µm and less or equal than 50 µm, preferably between 5 µm and less or equal than 30 µm, more preferably between 10 µm and less or equal 20 µm.

The orienting step b) can be performed either simultaneously with the coating step a) or subsequently to the coating step a). Magnetic orientation of magnetic particles is described and known in the art. Reference is made in this respect to the prior art documents cited in the introductory portion of the present application.

The curing/drying step c) can be performed by physical evaporation of volatile compounds, UV-curing, oxidative reticulation, chemical cross-linking, electron beam curing, or by any combination thereof. Also this step is known in the art and does not have to be described here in detail.

The present invention is furthermore related to a magnetically induced image coating on a substrate which comprises magnetically oriented pigment (P) in a cured solid ink vehicle (I), characterized in that the ratio of the volume of the ink vehicle (V(I)) to the volume of the pigment (V(P)) is higher than 3.0, preferably higher than 4.0, and most preferably higher than 5.0, and that the coating layer is thicker than d50/3, preferably thicker than d50/2, wherein d50 is the mean diameter of the magnetically orientable optically variable interference pigment flakes. The amount of magnetically oriented pigments in the cured solid ink vehicle (I) ranges between 1% to 40% per weight, preferably between 5% to 30% per weight, more preferably between 10-20% per weight of the wet coating.

The printing ink or coating composition of the present invention can be used for producing magnetically induced images. Said magnetically induced images can be used as security elements for e.g. banks notes, credit cards, access cards, security badges, documents of value, rights or identity, transportation tickets, lottery tickets, event tickets, tax banderoles, security threads, labels, foils, strips or product security applications. Thus, the present invention is also related to the use of the herein disclosed coating compositions for the above applications, as well as to a security document comprising a magnetically induced image obtained with a coating composition of the present invention.

Said security element may further comprise additional marking means such as infrared markers, fluorescent markers, UV markers, phosphorescent markers, magnetic markers, forensic markers and mixtures thereof.

The invention can be practiced on any type of printable sheet or web material, in particular on materials used for producing e.g. banks notes, credit cards, access cards, security badges, documents of value, rights or identity, transportation tickets, lottery tickets, event tickets, tax banderoles, security threads, labels, foils, strips or product security applications. The printable sheet or web material may further comprise a single layer, as well as a plurality of layers.

The present invention will now be further described by reference to non-limiting examples and drawings. Unless indicated otherwise, all amounts are given as weight percents.

Example 1

Intaglio Paper-Wipe Ink

In this example, a formulation of an intaglio paper-wipe ink according to the present invention is given.

| | |
|---|---|
| Addition product of tung oil and maleic acid modified phenolic resin in a high boiling mineral oil (PKWF 28/31) | 35% |
| Long oil alkyd resin | 7.50% |
| Alkylphenolic resin modified with raw tung oil in ink solvent 27/29 | 16% |
| Polyethylene wax | 3.30% |
| Aerosil 200 (Degussa-Huels) | 2.00% |
| Optically variable pigment magnetic (7 layers) | 30% |
| Ink solvent 27/29 (Shell Industrial Chemicals) | 6% |
| Cobalt octoate (11% metal) | 0.10% |
| Manganese octoate (10% metal) | 0.10% |

Example 2

Silkscreen Ink, UV-Drying

In this example, a formulation of a silkscreen ink according to the present invention is given.

| | Base Formula | Ex. 2a | Ex. 2b | Ex. 2c |
|---|---|---|---|---|
| Ink vehicle (I) total: | 70% | 80% | 60% | 30% |
| Epoxyacrylate oligomer | 40 | 45.7 | 34.2 | 17.1 |
| Trimethylolpropane triacrylate monomer | 10 | 11.5 | 8.6 | 4.3 |
| Tripropyleneglycol diacrylate monomer | 10 | 11.5 | 8.6 | 4.3 |
| Genorad 16 (Rahn) | 1 | 1.1 | 0.9 | 0.4 |
| Aerosil 200 (Degussa-Huels) | 1 | 1.1 | 0.9 | 0.4 |
| Irgacure 500 (CIBA) | 6 | 6.8 | 5.1 | 2.6 |
| Genocure EPD (Rahn) | 2 | 2.3 | 1.7 | 0.9 |
| Pigment (P) total: | 20% | 20% | 20% | 20% |
| Magnetic optically variable pigment (7 layers) | 20 | 20 | 20 | 20 |
| Solvent (S) total: | 10% | 0% | 20% | 50% |
| Dowanol PMA | 10 | 0 | 20 | 50 |

Figure 1A:
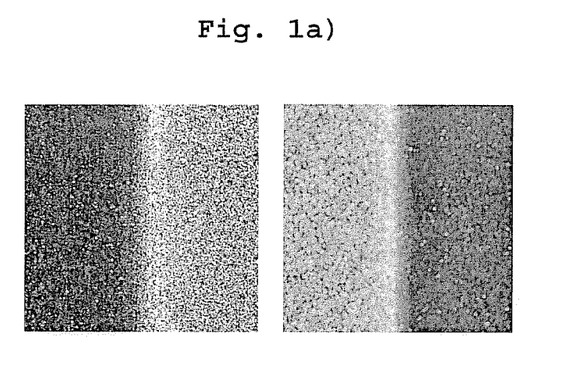
Figure 1B:
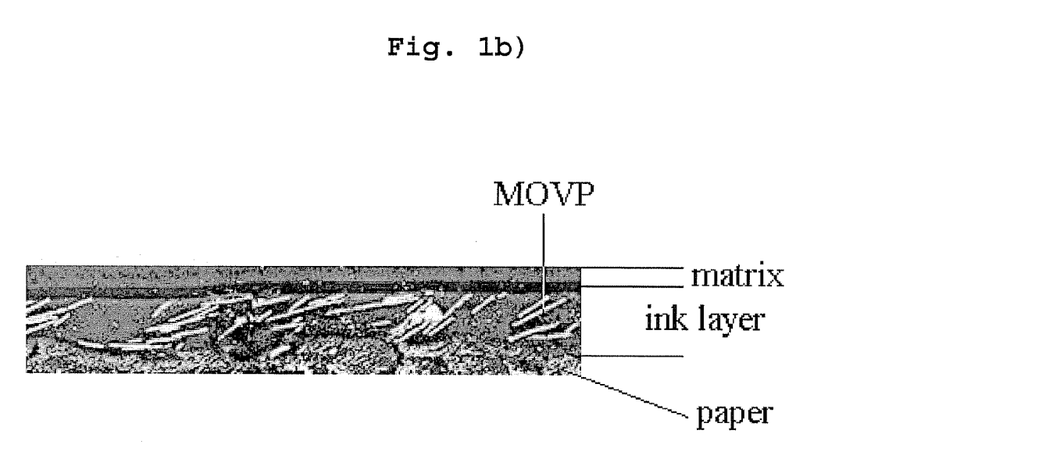

The formulation of example 2a was applied on security paper. Prior to drying the wet ink was magnetized. The average dry film thickness was 19 μm. The solid content of the ink was 100%, wherein the magnetic optically variable pigment (P) was present in an amount of 20% per weight and the ink vehicle (I) was present in an amount of 80% per weight. The result is shown in FIGS. 1a and 1b. In FIG. 1a, the resulting magnetized image is shown. In FIG. 1b, a Scanning electron microscope (SEM) cross section of the ink layer on the substrate is shown. The average angle of the flakes is measured as being 24°+/−12° from the horizontal. In FIG. 1b, "Matrix" refers to the embedding, which is needed for the preparation of cross sections. The effect produced by the magnetization is a clearly defined image.

Figure 2A:
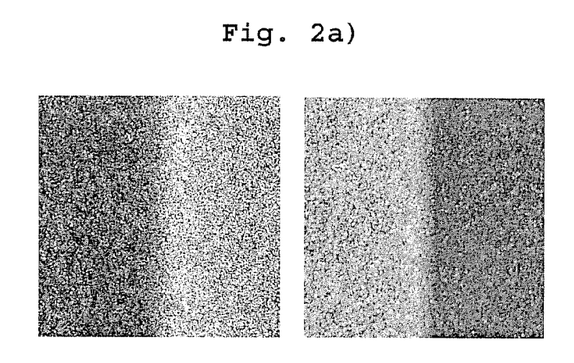
Figure 2B:
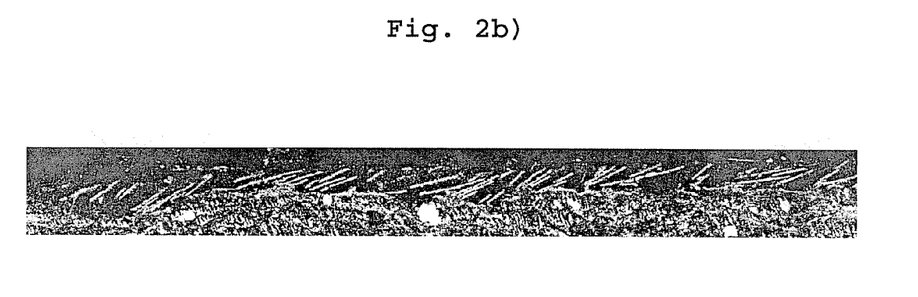

The formulation of example 2b was applied on security paper. Prior to drying the wet ink was magnetized. The average dry film thickness was 14 μm. The solid content of the ink was 80%, wherein the magnetic optically variable pigment (P) was present in an amount of 20% per weight, the ink vehicle (I) was present in an amount of 60% per weight, and the solvent (S) was present in an amount of 20% per weight. The result is shown in FIGS. 2a and 2b. In FIG. 2a, the resulting magnetized image is shown. In FIG. 2b, a SEM cross section of the ink layer on the substrate is shown. The average angle of the flakes is measured as being 25°+/−12° from the horizontal. The effect produced by the magnetization is an image of diminished resolution, but still quite clearly visible.

Figure 3A:
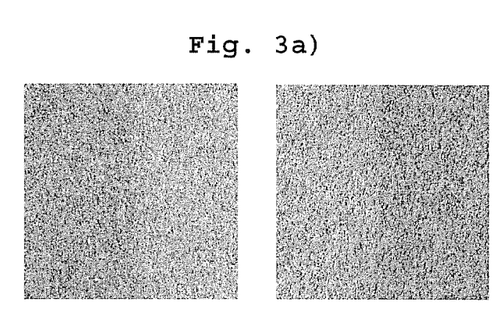
Figure 3B:
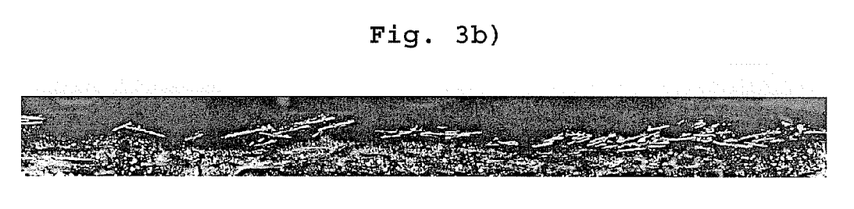

The formulation of example 2c was applied on security paper. Prior to drying the wet ink was magnetized. The average dry film thickness was 11 μm. The solid content of the ink was 50%, wherein the magnetic optically variable pigment (P) was present in an amount of 20% per weight, the ink vehicle (I) was present in an amount of 30% per weight, and the solvent (S) was present in an amount of 50% per weight. The result is shown in FIGS. 3a and 3b. In FIG. 3a, the resulting magnetized image is shown. In FIG. 3b, a SEM cross section of the ink layer on the substrate is shown. The average angle of the flakes is measured as being 10°+/−9° from the horizontal. The effect produced by the magnetization is an image of rather poorly defined resolution.

The formula of example 2a showed excellent magnetic orientability; that of example 2b showed some degradation, as compared to example 2a, and that of example 2c showed serious degradation, as compared to example 2a. It can be inferred that formulas with a ratio V(I)/V(P) lower than 3.0 will no longer show any useful effect.

It is evident from FIGS. 1 to 3 and from Table 1 above, that an excellent correlation exists between the orientability of the magnetic pigment and the volume ratio V(I)/V(P) on one hand, and between the orientability of the pigment and the dry film thickness on the other hand.

Example 3

Silkscreen Ink, UV-Drying

In this example, a formulation of silkscreen ink according to the present invention is given.

|  |  |  |
|---|---|---|
| Epoxyacrylate oligomer | 40% | I |
| Trimethylolpropane triacrylate monomer | 10% |  |
| Tripropyleneglycol diacrylate monomer | 10% |  |
| Genorad 16 (Rahn) | 1% |  |
| Aerosil 200 (Degussa-Huels) | 1% |  |
| Irgacure 500 (CIBA) | 6% |  |
| Genocure EPD (Rahn) | 2% |  |
| Optically variable pigment magnetic (5 layers) | 20% | P |
| Dowanol PMA | 10% | S |

Example 3

Flexography Ink, UV-Drying

In this example, a formulation of flexographic ink according to the present invention is given.

|  |  |
|---|---|
| Urethane acrylate oligomer | 40% |
| Glycerol propoxylated triacrylate monomer | 10% |
| Tripropyleneglycol diacrylate monomer | 15% |
| Florstab UV-1 (Kromachem) | 1% |
| Optically variable pigment magnetic (7 layers) | 25% |
| Aerosil 200 (Degussa-Huels) | 1% |
| Irgacure 500 (CIBA) | 6% |
| Genocure EPD (Rahn) | 2% |

The invention claimed is:

1. Coating composition for producing a magnetically induced image, consisting of volatile components (S) and nonvolatile components, the non-volatile components consisting of an ink vehicle (I) and magnetically orientable optically variable interference pigment (P), wherein the ratio of the volume of the ink vehicle (V(I)) to the volume of the pigment (V(P)) is higher than 5.0, and that said coating composition is a printing ink selected from the group consisting of flexographic printing inks, gravure printing inks, silkscreen printing inks and roller coating inks.

2. Coating composition according to claim 1, wherein said non-volatile components are present in an amount greater than 50% per weight of the total composition.

3. Coating composition according to claim 1, wherein said non-volatile components are present in an amount greater than 80% per weight of the total composition.

4. Coating composition according to claim 1, wherein said volatile components are selected from the group consisting of organic solvents, water, and mixtures thereof.

5. Coating composition according to claim 1, wherein said magnetically orientable optically variable pigment is selected from the group consisting of vacuum deposited magnetic thin film interference pigments, interference coated metallic pigments, interference coated non-metallic pigments, magnetic liquid crystal pigments, and mixtures thereof.

6. Coating composition according to claim 5, wherein said magnetically orientable interference pigment is selected from the group consisting of five-layer and seven-layer vacuum deposited magnetic thin film interference pigment.

7. Coating composition according to claim 1, wherein said magnetically orientable interference pigment has a mean diameter d50 in the range of 5 μm to 40 μm.

8. Coating composition according to claim 1, wherein said magnetically orientable interference pigment has a mean diameter d50 in the range of 15 μm to 25 μm.

9. Coating composition according to claim 1, wherein said magnetically orientable interference pigment has a thickness in the range of 0.1 μm to 6 μm.

10. Coating composition according to claim 1, wherein said magnetically orientable interference pigment has a thickness in the range of 0.5 μm to 3 μm.

11. Process for manufacturing a coating composition for producing a magnetically induced image according to claim 1, said process comprising of mixing together volatile components (S), and non-volatile components, the non-volatile components consisting of an ink vehicle (I) and of magnetically orientable optically variable interference pigment (P), wherein the ratio of the volume of the ink vehicle (V(I)) to the volume of the pigment (V(P)) is higher than 5.0, and that said coating composition is a printing ink selected from the group consisting of flexographic printing inks, gravure printing inks, silkscreen printing inks and roller coating inks.

12. Process according to claim 11, wherein said nonvolatile components are present in an amount greater than 50% per weight of the total composition.

13. Process according to claim 11, wherein said nonvolatile components are present in an amount greater than 80% per weight of the total composition.

14. Process according to claim 11, wherein said volatile components (S) are selected from the group consisting of organic solvents, water, and mixtures thereof.

15. Process according to claim 11, wherein said magnetically orientable optically variable pigment is selected from the group consisting of vacuum deposited magnetic thin film interference pigments, interference coated metallic pigments, interference coated non-metallic pigments, magnetic liquid crystal pigments, and mixtures thereof.

16. Process according to claim 15, wherein said magnetically orientable interference pigment is selected from the group consisting of five-layer and seven-layer vacuum deposited magnetic thin film interference pigment.

17. Process according to claim 11, wherein said magnetically orientable interference pigment has a mean diameter d50 in the range of 5 μm to 40 μm.

18. Process according to claim 11, wherein said magnetically orientable interference pigment has a mean diameter d50 in the range of 15 μm to 25 μm.

19. Process according to claim 11, wherein said magnetically orientable interference pigment has a thickness in the range of 0.1 μm to 6 μm.

20. Process according to claim 11, wherein said magnetically orientable interference pigment has a thickness in the range of 0.5 μm to 3 μm.

21. Process of producing a magnetically induced image comprising (a) applying a coating composition according to claim 1 to a substrate surface, (b) orienting the magnetic pigment particles in the applied coating composition of (a) by applying a magnetic field, and (c) curing/drying the oriented coating composition of step (b) to fix the particles in the oriented positions.

22. Process according to claim 21, wherein said orienting (b) is performed simultaneously with said applying a coating (a).

23. Process according to claim 21, wherein said orienting (b) is performed subsequently to said applying a coating (a).

24. Process according to claim 21, wherein said curing/drying (c) is carried out by a process selected from the group consisting of physical evaporation of volatile compounds, UV-curing, oxidative reticulation, chemical crosslinking, electron beam curing, or any combination thereof.

* * * * *

UNITED STATES PATENT AND TRADEMARK OFFICE
CERTIFICATE OF CORRECTION

| | | |
|---|---|---|
| PATENT NO. | : 8,246,735 B2 | Page 1 of 1 |
| APPLICATION NO. | : 12/300469 | |
| DATED | : August 21, 2012 | |
| INVENTOR(S) | : P. Degott et al. | |

It is certified that error appears in the above-identified patent and that said Letters Patent is hereby corrected as shown below:

On the cover page, page 2, Foreign Patent Documents, change "EP0227423 7/1987" to --EP0227423 6/1992--.

Column 14, claim 11, line 20, change "comprising of mixing" to --comprising mixing--.

Column 15, claim 21, line 2, change "composition of step (b)" to --composition of (b)--.

Signed and Sealed this
Nineteenth Day of March, 2013

Teresa Stanek Rea
*Acting Director of the United States Patent and Trademark Office*